United States Patent
Nash et al.

(10) Patent No.: US 12,209,381 B1
(45) Date of Patent: Jan. 28, 2025

(54) FOUNDATION TILT REPORTING SYSTEMS AND METHODS

(71) Applicant: United Services Automobile Association (USAA), San Antonio, TX (US)

(72) Inventors: Justin Royell Nash, Little Elm, TX (US); Gideon Bowie Luck, Wylie, TX (US); Huihui Wu, Grapevine, TX (US); Julia Yilan Kennedy, Austin, TX (US); Yevgeniy Viatcheslavovich Khmelev, San Antonio, TX (US); Subhalakshmi Selvam, Allen, TX (US); Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 468 days.

(21) Appl. No.: 17/748,764

(22) Filed: May 19, 2022

Related U.S. Application Data (60) Provisional application No. 63/191,313, filed on May 20, 2021.

(51) Int. Cl.
*G01C 15/00* (2006.01)
*E02D 33/00* (2006.01)
*G01C 19/06* (2006.01)

(52) U.S. Cl.
CPC .......... *E02D 33/00* (2013.01); *G01C 15/006* (2013.01); *G01C 15/008* (2013.01); *G01C 19/06* (2013.01)

(58) Field of Classification Search
CPC ........ E02D 33/00; G01C 15/008; G01C 9/06; G01C 2009/066
USPC ......... 33/1 H, 348.2, 366.11, 366.23, 366.27
See application file for complete search history.

(56) References Cited

U.S. PATENT DOCUMENTS

| | | | | |
|---|---|---|---|---|
| 4,110,609 | A * | 8/1978 | Beer ........................ | G01C 9/06 33/366.11 |
| 5,313,713 | A * | 5/1994 | Heger ....................... | G01C 9/06 33/343 |
| 5,450,676 | A * | 9/1995 | Thornsberry ............ | G01C 9/06 33/366.16 |
| 5,488,779 | A * | 2/1996 | Schultheis ............... | G01C 9/32 33/366.27 |
| 6,625,896 | B1 * | 9/2003 | Olson ...................... | G01C 9/20 33/366.11 |
| 7,055,254 | B1 * | 6/2006 | Fabian ..................... | G01C 9/34 33/366.11 |

(Continued)

*Primary Examiner* — George B Bennett
(74) *Attorney, Agent, or Firm* — Fletcher Yoder, P.C.

(57) ABSTRACT

A foundation tilt reporting system includes a lightbulb with one or more emitters configured to emit light. The foundation tilt reporting system also includes one or more sensors configured to generate signals indicative of a current tilt of a foundation of a structure. The foundation tilt reporting system further includes one or more processors and memory storing instructions executable by the one or more processors to cause the one or more processors to access a threshold for the foundation, receive the signals indicative of the current tilt of the foundation from the one or more sensors, compare the current tilt of the foundation to the threshold, and instruct the one or more emitters to emit the light to provide an indication in response to the current tilt of the foundation meeting or exceeding the threshold.

20 Claims, 2 Drawing Sheets

(56) References Cited

U.S. PATENT DOCUMENTS

| | | | | |
|---|---|---|---|---|
| 7,188,426 | B2* | 3/2007 | Barr | G01C 9/06 |
| | | | | 33/366.19 |
| 7,370,428 | B2* | 5/2008 | Decker, Jr. | G01C 9/06 |
| | | | | 33/366.11 |
| 11,512,954 | B2* | 11/2022 | Loebig | G01C 9/08 |
| 11,668,563 | B2* | 6/2023 | Sakakibara | G01C 9/04 |
| | | | | 33/366.27 |
| 12,104,924 | B1* | 10/2024 | Henchon | G01C 9/06 |
| 2007/0180719 | A1* | 8/2007 | Donnelly | B60S 9/02 |
| | | | | 33/366.11 |
| 2007/0268480 | A1* | 11/2007 | Kaye | A61G 7/05 |
| | | | | 356/138 |
| 2021/0404806 | A1* | 12/2021 | Loebig | G01C 9/08 |
| 2024/0288269 | A1* | 8/2024 | Dorrough | G01C 9/06 |

* cited by examiner

FOUNDATION TILT REPORTING SYSTEMS AND METHODS

CROSS-REFERENCE TO RELATED APPLICATION

This application claims priority to and the benefit of U.S. Provisional application Ser. No. 63/191,313, entitled "FOUNDATION TILT REPORTING SYSTEMS AND METHODS" and filed May 20, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

In certain regions, ground shifts may cause a foundation (e.g., concrete slab) of a structure to tilt. Over time, the foundation of the structure may tilt to a degree that causes damage to other parts of the structure. For example, the tilt may cause cracks in walls or cause structural beams to separate from one another.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a foundation tilt reporting system includes a lightbulb with one or more emitters configured to emit light. The foundation tilt reporting system also includes one or more sensors configured to generate signals indicative of a current tilt of a foundation of a structure. The foundation tilt reporting system further includes one or more processors and memory storing instructions executable by the one or more processors to cause the one or more processors to access a threshold for the foundation, receive the signals indicative of the current tilt of the foundation from the one or more sensors, compare the current tilt of the foundation to the threshold, and instruct the one or more emitters to emit the light to provide an indication in response to the current tilt of the foundation meeting or exceeding the threshold.

In one embodiment, a lightbulb for a foundation tilt reporting system includes a housing with a transparent or semi-transparent portion and a base portion. The lightbulb also includes one or more emitters configured to emit light through the transparent or semi-transparent portion. The lightbulb further includes one or more processors and memory storing instructions executable by the one or more processors to cause the one or more processors to access a threshold for a foundation of a structure, receive signals indicative of a current tilt of the foundation, compare the current tilt of the foundation to the threshold, and instruct the one or more emitters to emit the light in response to the current tilt of the foundation meeting or exceeding the threshold.

In one embodiment, a method of operating a foundation tilt reporting system includes accessing, via one or more processors, a threshold for a foundation of a structure. The method also includes receiving, at one or more processors, signals indicative of a current tilt of the foundation of the structure from one or more sensors. The method further includes comparing, using the one or more processors, the current tilt of the foundation of the structure to the threshold. The method further includes instructing, using the one or more processors, one or more emitters of a lightbulb to emit light to provide an indication in response to the current tilt of the foundation of the structure exceeding the threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A foundation is an element of a structure (e.g., building) that connects the structure to a ground and transfers loads (e.g., weight) from the structure to the ground. The foundation provides the structure with stability from the ground. For example, the foundation may provide a leveled surface for construction of the structure, may anchor the structure into the ground to protect against natural forces (e.g., soil settlement, wind, flood, earthquake), and may distribute the weight of the structure to avoid overloading underlying soil, and so on.

Foundation changes (e.g., tilting, shifting, cracking) may be serious problems that may cause potential damage or risks to the structure. The foundation changes may occur in areas where the underlying soil expands when the soil is damp or shrinks when the soil is dry, thereby pushing or dragging the foundation to cause the foundation changes. In some cases, the foundation changes may occur when water-saturated soil freezes and expands (e.g., in winter time) and this may cause the foundation to "tilt." However, a user of the structure (e.g., an owner of the structure; a property owner) may not be aware of the foundation changes, at least during initial periods of the foundation changes (e.g., when a degree of tilt is relatively small). Indeed, the user of the structure may not be aware of the foundation changes until the degree of tilt or severity of the changes causes visible damage to other parts of the structure, such as visible cracks in walls of the structure. Further, without the disclosed embodiments, detection of the foundation changes may be done by a skilled inspector that travels to the structure to carry out a physical inspection of the property. Because of this, a foundation tilt reporting system may be preferred to efficiently alert the user of the structure to the foundation changes.

The foundation tilt reporting system disclosed herein may alert the user of the structure that a foundation tilt of the structure has exceeded a threshold (e.g., tilt threshold). The foundation tilt reporting system may use a lightbulb (or any other suitable light emitter) to provide the alert, and the lightbulb may illuminate in a way that identifies an area of the foundation that exhibits the foundation tilt that has exceeded the threshold. Advantageously, the user of the structure would not purchase a separate device solely to track the foundation tilt because the lightbulb may function like a typical lightbulb (e.g., installed in a table lamp, a ceiling-mounted light fixture, or wall-mounted light fixture; emits light to illuminate a room of the structure in response to being turned on/receiving electrical current via actuation of an input device, such as a light switch). The lightbulb may include a filament that heats up via electrical current to emit packets of visible light, a light emitting diode chip (e.g., semiconductor) that emits light as electrical current flows through it, or any other suitable light emitter. Additionally or alternatively, the lightbulb may have an appearance of a typical lightbulb (e.g., a housing with a transparent or semi-transparent portion and a base portion that are coupled together). For example, the transparent or semi-transparent portion may include a plastic and/or glass top. Further, the base portion may include a metal or plastic base that is configured to be fitted into and/or threadably coupled to a socket, or otherwise coupled to a surface, such as adhered or fastened to a wall. In any case, the lightbulb may also have additional capabilities. The additional capabilities may include, but are not limited to, detecting the foundation tilt, communicating with a computing system, and/or generating a visual indication in response to the foundation tilt exceeding the threshold or to otherwise represent the foundation changes.

The threshold may be based on foundation tilt data associated with multiple foundations in a specific region or area. For example, the threshold may be based on the foundation tilt data of multiple foundations in a specific neighborhood where the structures are on similar soil types and are subject to similar environmental conditions. Additionally or alternatively, the threshold may be based on the foundation tilt data of a set of structures that have similar, if not the same, type of foundation and/or other characteristics (e.g., size of the structure; age of the structure; property type or use, such as commercial or residential). The visual indication of the foundation tilt may prompt the user of the structure to make adjustments to the foundation to mitigate future, more expensive, corrective maintenance.

To facilitate the disclosed techniques, the foundation tilt reporting system may include the lightbulb and one or more sensors (e.g., a laser-level sensor, a gyroscope, an accelerometer) that are configured to detect one or more parameters that are indicative of the foundation tilt. The one or more sensors may be coupled to (e.g., physically coupled, such as fastened, and/or communicatively coupled) or positioned within the lightbulb and may provide signals that are indicative of the one or more parameters to a computing system. The computing system may process the signals to determine the one or more parameters, determine a presence of foundation tilt at the structure based on the one or more parameters, and instruct appropriate action in response to the presence of the foundation tilt. The appropriate action may include providing an output that indicates the presence of the foundation tilt at the structure. For example, the output may be an audible alert and/or a visual notification to notify the user of the foundation tilt of the structure. In some embodiments, the foundation tilt reporting system may be configured to generate an augmented reality (AR) representation accessible by using a mobile electronic device. The AR representation may also include additional information, such as the one or more parameters measured by the one or more sensors.

Furthermore, the lightbulb may have a separate power supply (e.g., battery or capacitor). In some embodiments, the lightbulb may only have the separately power supply without any connection to other types of power supplies (e.g., not wired to a conventional power source). In some embodiments, the lightbulb includes the separately power supply and is connected to a conventional power supply. In such cases, when the light is switched on by the conventional power source (e.g., by flipping a light switch to an "on" position), power may be received at and stored within the separate power supply of the lightbulb. In any case, the stored power may enable the lightbulb to operate (e.g., to provide alerts related to the foundation tilt) in instances in which the conventional power supply is not available to the lightbulb (e.g., due to lack of connection; after flipping the light switch to an "off" position). Further, in some embodiments, the lightbulb may be devoid of any separate power supply and/or may provide the alerts (e.g., light) when (e.g., only when) the conventional power source is connected to the lightbulb (e.g., each time the light switch is actuated to the "on" position). As discussed herein, the alerts may be provided for any period of time and/or at different times depending on the available power and/or other inputs. For example, the alerts may be provided only during an initial time period after the conventional power source is connected to the lightbulb or periodically as long as there is sufficient power (e.g., from the conventional power source and/or from the separate power supply).

Figure 1:
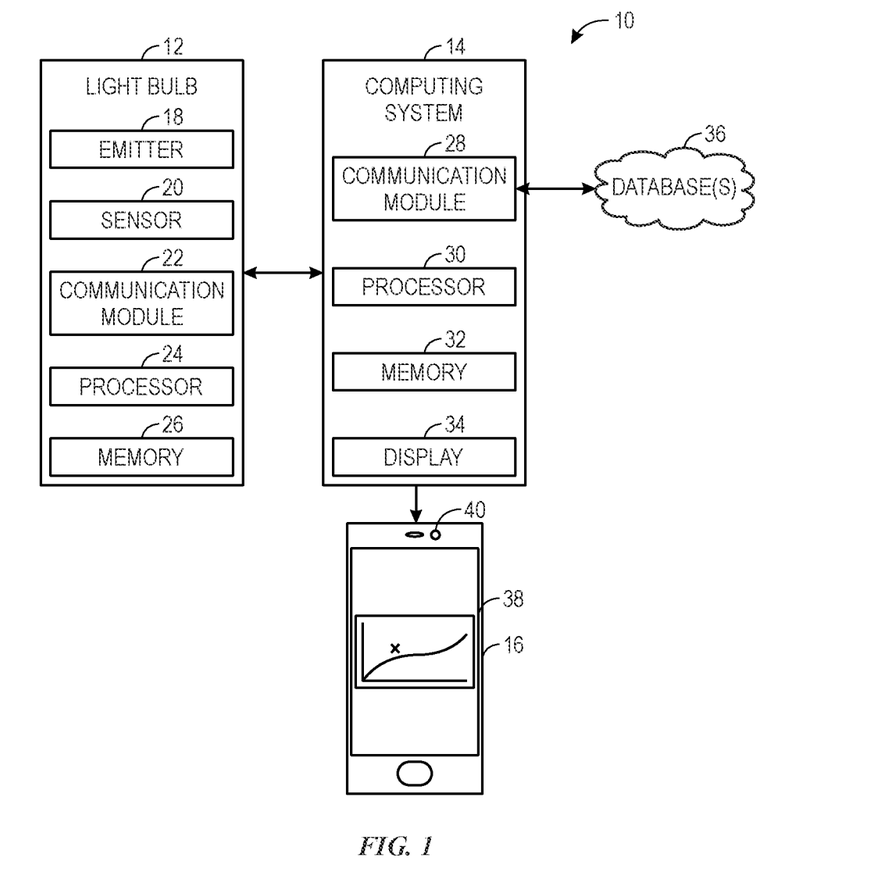
FIG. 1 illustrates a block diagram of a foundation tilt reporting system, in accordance with embodiments described herein.

By way of introduction, FIG. 1 illustrates a block diagram of an embodiment of a foundation tilt reporting system 10 that may include a lightbulb 12, a computing system 14, a mobile electronic device 16, and one or more databases 36. The lightbulb 12 may include an emitter 18, one or more sensors 20, a communication module 22, a processor 24, and a memory 26. The emitter 18 may be positioned in and/or configured to emit light into a transparent or semi-transparent portion of the lightbulb 12, while the one or more sensors 20, the communication module 22, the processor 24, the memory 26, and/or other components may be positioned in a base portion of the lightbulb 12 (e.g., not visible from an exterior of the lightbulb 12; hidden from view).

The emitter 18 may be a light emitter that is configured to emit light (e.g., visible light, ultra-violet (UV) light, infrared light). The emitter 18 may enable the lightbulb 12 to provide light to an area surrounding the lightbulb 12. For example, if the lightbulb 12 is disposed within a room of a structure, the emitter 18 may enable the lightbulb 12 to provide light to the room (e.g., to provide visible light to illuminate the room, such that there sufficient light for users to carry out activities in the room). In addition, the emitter 18 may emit one or more colors of the visible light spectrum (e.g., red, orange, blue) to indicate a degree to which a foundation of the structure is tilted, such as relative to a baseline for the structure and/or a threshold. It should be appreciated that the lightbulb 12 may include one emitter 18 that carries out multiple functions or more than one emitter 18 to carry out the multiple functions. For example, the lightbulb 12 may include a first emitter 18 that emits light in a first manner (e.g., with first characteristics or properties, such as color, direction, and/or spread; for typical use to illuminate the room), and the first emitter 18 or a second emitter 18 that emits light in a second manner (e.g., with second characteristics or properties, such as color, direction, and/or spread; to indicate a condition of the foundation, such as the degree of foundation tilt).

The one or more sensors 20 may include any of a variety of types of sensors 20 that are configured to detect one or more parameters that are indicative of the tilt of the foundation. For example, the one or more sensors 20 may include a laser-level sensor that is configured to detect a current level (e.g., tilt) of the foundation, an accelerometer that is configured to detect acceleration, a gyroscope that is configured to detect rotation, and/or a position sensor that is configured to detect a position. The laser-level sensors may be used to detect the current level of the foundation by using laser technology. The laser-level sensors may emit an array of laser beams that detects current levels of objects (e.g., furniture, countertops) and communicates the current levels to the computing system 14. Data (e.g., parameter data; level data) that the laser-level sensors communicate to the computing system may assist in determining if there is a tilt in the foundation. Data (e.g., parameter data; acceleration data; rotation data) that the accelerometer and/or the gyroscope communicate to the computing system 14 may assist in determining if there is a tilt in the foundation. The position may be used to identify a more specific location of the foundation tilt. The position sensor may include a global positioning system (GPS) receiver that is configured to receive signals indicative of absolute coordinates (e.g., GPS coordinates) via communication with GPS satellites.

The communication module 22 may be a wireless or wired communication component that may facilitate communication between the lightbulb 12 and various other components of the foundation tilt reporting system 10 via a network (e.g., the Internet or an Intranet system). The processor 24 may be any type of computer processor or microprocessor capable of executing computer-executable code. The processor 24 may also include multiple processors that may perform the operations described herein.

The memory 26 may be any suitable articles of manufacture that can serve as media to store processor-executable code, data, or the like. These articles of manufacture may represent computer-readable media (e.g., any suitable form of memory or storage) that may store the processor-executable code used by the processor 24 to perform the presently disclosed techniques. As used herein, applications may include any suitable computer software or program that may be installed onto the computing system 14 and executed by the processor 24. The memory 26 may represent non-transitory computer-readable media (e.g., any suitable form of memory or storage) that may store the processor-executable code used by the processor 24 to perform various techniques described herein. It should be noted that non-transitory merely indicates that the media is tangible and not a signal.

As mentioned above, the lightbulb 12 may be communicatively coupled to the computing system 14 via the network. The computing system 14 may include any suitable computer device, such as a general-purpose personal computer, a laptop computer, a tablet computer, a mobile computer, and the like. The computing system 14 may include or be a cloud computing system and/or a distributed computing system. The computing system 14 may include various types of components that may work together to perform various types of computer tasks and operations. For example, the computing system 14 may include a communication module 28, a processor 30, a memory 32, and a display 34. The communication module 28 may be a wireless or wired communication component that may facilitate communication between the other components of the system 10 via the network. It should be appreciated that the processor 30 and the memory 32 may have features that are the same as or similar to the processor 24 and the memory 26, respectively.

The computing system 14 may collect the parameter data obtained by the one or more sensors 20 to assist in determining indications to output. Specifically, the computing system 14 may compare the collected parameter data to parameter data stored in the database 36. The stored parameter data may be parameter data collected from surrounding structures and/or other relevant structures (e.g., in the same neighborhood and/or from a set of structures with similar characteristics), a set of parameter data established by an insurance provider or foundation builder, or any combination thereof. For example, the stored parameter data may include a respective foundation tilt value (e.g., a foundation angle displacement from 180 degrees or horizontal) for each of the surrounding structures. In some embodiments, the stored parameter data may include an average or a median of the respective foundation tilt values for each of the surrounding structures. The stored parameter data may be updated over time. In some cases, the stored parameter data may be updated periodically over time (e.g., every day) and/or in real-time (e.g., substantially real time; in response to new parameter data being received from the one or more sensors 20, which may occur each time power is provided to the one or more sensors 20 via actuation of the light switch to the "on" position).

The computing system 14 may access or determine a threshold (e.g., tilt threshold). In some embodiments, the threshold may be set to a value, such as 0.5, 0.75, 1, 1.25, or 1.5 degrees, which is known to be associated with an increase in damage to other parts of the structure. In some embodiments, the threshold may be dynamic and may be set as the average or the median of the respective foundation tilt values for the other relevant structures. The threshold may be set to be an amount or a percentage above the average or the median of the respective foundation tilt values for the other relevant structures. For example, if the average is 1 degree (e.g., from horizontal), the threshold may be set to 1.5 degrees. The computing system 14 may compare the collected parameter data to the threshold to determine whether the foundation tilt of the structure exceeds the threshold. The threshold may be updated over time. In some cases, the threshold may be updated periodically over time (e.g., every day) and/or in real-time (e.g., substantially real time; in response to new parameter data being received from the one or more sensors of the other relevant structures).

The indication may vary depending on the foundation tilt. For example, the lightbulb 12 may output a first visual indication (e.g., a yellow light) to indicate that the foundation tilt is approaching the threshold (e.g., within 0.5 degrees of the threshold). However, the lightbulb 12 may output a second visual indication (e.g., a red light) to indicate that the foundation tilt exceeds the threshold. As another example, the lightbulb 12 may output a first visual indication to indicate that the foundation tilt exceeds the average or the median of the of the respective foundation tilt values for the other relevant structures, and the lightbulb 12 may output a second visual indication to indicate that the foundation tilt exceeds the threshold (e.g., set to a fixed value).

The indication may also reflect the rate of change in the foundation tilt and/or a time estimation of when the foundation tilt may exceed the threshold (e.g., predicted by the computing system 14 based on the rate of change in the foundation tilt). For example, the lightbulb 12 may output a first visual indication to indicate that the rate of change in the foundation tilt exceeds a threshold rate (e.g., set to a value or set based on the rate of change in the respective foundation tilt values for the other relevant structures), and the lightbulb 12 may output a second visual indication to indicate that the time estimation is within a range (e.g., within one year). It should be appreciated that any of a variety of indications may be used together and/or provided in any suitable manner (e.g., one indication to indicate that the foundation tilt is approaching the threshold, one indication to indicate that the foundation tilt exceeds the threshold, one indication to indicate that the rate of change in the foundation tilt exceeds the threshold rate, and so on).

In addition, or alternatively, the computing system 14 may send an electronic notification (e.g., a push notification) to the mobile electronic device 16. The mobile electronic device 16 may include a display 38 capable of presenting information and a camera 40 capable of capturing photos and videos. The electronic notification may be presented via the display 38. The electronic notification may include more specific information associated with the foundation tilt. For example, the information may include specific foundation tilt values of the structure (e.g., a degree of tilt at a current time and/or over time, such as a curve or profile that indicates changes over time; a tilt progression over time), respective foundation tilt values of the other relevant structures, the threshold, the time estimation of when the foundation may exceed the threshold, or any combination thereof. Having both the visual indication and the electronic notification may enable the property owner to be alerted about a potentially problematic foundation tilt, even if they are not present at the structure and/or even if the foundation tilt is not yet noticeable at the structure. The specific information included in the electronic notification may assist the user of the structure in taking action to reduce the amount of the foundation tilt. A link that may be included in the electronic notification may redirect the person to an interface communicatively coupled to the computing system 14, such that the collected data is presented via the display 38.

In some embodiments, the camera 40 of the mobile electronic device 16 may be configured to capture images that may be augmented and displayed to enable the user to visualize the current level of the foundation through augmented reality (AR). For example, the lightbulb 12 may collect foundation tilt data and communicate it to the computing system 14. After the collected data has been communicated from the lightbulb 12 to the computing system 14, the computing system 14 may generate and communicate an augmented representation of the current level of the foundation in an area surrounding the lightbulb 12 to the mobile electronic device 16. The user may then view images captured by the camera 40 on the display 38, and the augmented representation of the current level of the foundation (e.g., one or more lines that represent an angle of the tilt relative to horizontal) may be overlaid onto the images in a dynamic manner that enables the user to visualize the current level of the foundation as the user moves the camera 40 to scan the area surrounding the lightbulb 12 (e.g., as the user pans around the room). In some embodiments, an image captured by the camera 40 and the data indicative of the foundation tilt may be processed together by the computing system 14, which may then generate and communicate an augmented image with the current level of the foundation overlaid onto the image for display on the display 38. This may enable a person to efficiently visualize the foundation tilt.

With the foregoing in mind, the computing system 14 may receive insurance policy data regarding the user and the structure. To better enable the user to maintain the structure, the computing system 14 may provide recommended maintenance or preventative operations for the user to perform based on the foundation tilt of the structure. For instance, the computing system 14 may determine that the foundation tilt of the structure is approaching the threshold. Based on the determination, the computing system 14 may send a recommendation, via the electronic notification, for the user to perform certain maintenance or preventative operations on the structure. The performance of these maintenance operations may indicate to the computing system 14 that the user is responsive to maintenance requests, and thus, may result in a modification (e.g., reduction) to the structure's insurance cost (e.g., premium and/or deductible). For example, the recommendation may be to water a portion of the foundation. Then, if a moisture sensor at the portion of the foundation detects water and provides an indication to the computing system 14, the computing system 14 may determine that the user has responded to the maintenance requests (or has a pattern of responding to the maintenance requests) and instruct the modification to the structure's insurance cost.

It should also be appreciated that the lightbulb 12 may be configured to operate without the computing system 14. For example, the memory 26 of the lightbulb 12 may store the threshold, and the processor 24 of the lightbulb 12 may process the parameter data from the one or more sensors 20 to determine whether the foundation tilt exceeds the threshold. Then, in response to the foundation tilt exceeding the threshold, the processor 24 of the lightbulb 12 may instruct the emitter 18 to emit the light. In such cases, the threshold may be established at manufacturing of the lightbulb 12; however, the lightbulb 12 may be programmable, such that the user or other entity (e.g., an insurance company) may set and store the threshold in the memory 26 of the lightbulb 12 after manufacturing. It should be appreciated that, in some embodiments, the one or more sensors 20 may be positioned outside of and/or physically separate from the lightbulb 12. Furthermore, instead of or in addition to the emitter 18, the lightbulb 12 may include a display or other indicator to provide information about the foundation tilt to the user. Furthermore, any of the steps or processing aspects disclosed herein as being performed by components of the computing system 14 may be performed by components of the lightbulb 12, and vice versa. Indeed, any of the steps or processing aspects disclosed herein may be divided between the components of the lightbulb 12 and the components of the computing system 14 (e.g., the computing system 14 dynamically calculates the threshold, which is periodically or otherwise communicated to the lightbulb 12 and stored in the memory 26 of the lightbulb 12 to thereby enable the processor 24 of the lightbulb 12 to compare the foundation tilt to the threshold and carry out the notification aspects).

It should also be appreciated that the foundation tilt may not be determined to exceed the threshold unless the foundation tilt exceeds the threshold for a period of time (e.g., continuously; for more than 5, 10, 30, 60 minutes or more). Similarly, the respective foundation tilt values for other relevant structures may not be stored or used to determine the threshold unless the respective foundation tilt values are steady for a period of time. Thus, temporary or transient changes to the data due to the position of the lightbulb 12 (e.g., due to moving furniture) and/or other factors (e.g., strong storms) may not affect assessment of the foundation tilt. It should also be appreciated that the threshold may be a rate of tilt, such as a rate of 0.25 degrees per year. Then, if the rate of the foundation tilt exceeds 0.25 degrees per year, then any of the indications described herein to alert may be provided by the system 10. In some embodiments, the one or more sensors 20 may be triggered to initiate and/or to communicate data for analysis in response to an event, such as an earthquake (e.g., as indicated by weather data or sensor data that indicates the event; triggered via instructions communication from the computing system 14).

As noted herein, the lightbulb 12 may have a separate power supply (e.g., battery or capacitor) and/or may be coupled to a conventional power source (e.g., wired to a current source). Stored power may enable the lightbulb 12 to operate (e.g., to operate the one or more sensors 20 and/or to emit light from the emitter 18 to provide alerts related to the foundation tilt) in instances in which the conventional power supply is not available to the lightbulb 12. In some embodiments, the lightbulb 12 may operate the one or more sensors 20 and/or operate the emitter 18 to provide the alerts (e.g., light) when (e.g., only when) the conventional power source is connected to the lightbulb 12 (e.g., while the light switch is actuated to the "on" position). In some embodiments, the lightbulb 12 may be wired such that the lightbulb 12 is always connected to the conventional power source (e.g., unless there is a power outage), but the emitter 18 is controlled to emit light based on inputs received at the lightbulb 12. For example, the emitter 18 may be controlled to emit light in a first manner to illuminate the room in response to a first input/switch position, and to emit light to indicate a current value of the foundation tilt in response to a second input/switch position. As another example, the emitter 18 may be controlled to illuminate in a manner that provides the current condition of the foundation tilt during an initial period after the lightbulb is turned on to operate as the typical lightbulb via the input device (e.g., the emitter 18 is red for three seconds, and thereafter the emitter 18 provides typical light output to illuminate the room). As yet another example, the emitter 18 may illuminate continuously and/or periodically (e.g., every morning at 8 am) to provide the indication of the foundation tilt. As yet another example, the emitter 18 may turn on and/or illuminate continuously in response to the foundation tilt exceeding the threshold (e.g., continuously while the foundation tilt exceeds the threshold). The one or more sensors 20 may be powered and/or controlled to collect the data via any of the above-noted techniques for powering the lightbulb 12.

Figure 2:
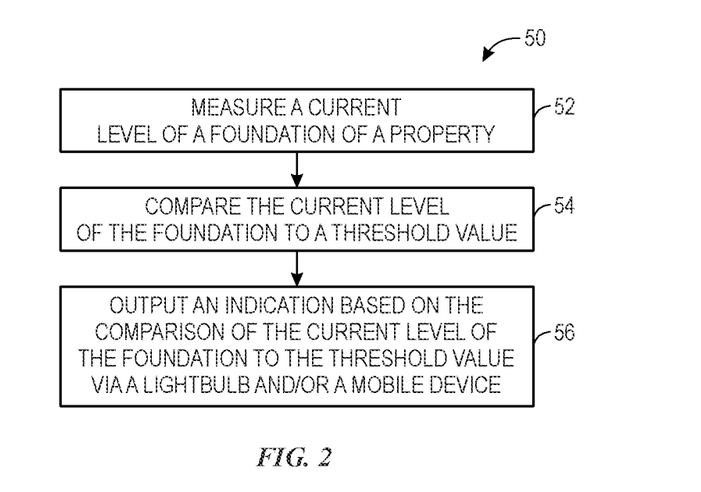
FIG. 2 illustrates a flow diagram of a process for employing the foundation tilt reporting system of FIG. 1, in accordance with embodiments described herein.

With this in mind, FIG. 2 illustrates a flow chart of a method 50 for determining a foundation tilt and outputting an indication based on the collected data from the lightbulb 12, the computing system 14, the databases 36, and the like. In general, the computing system 14 may receive collected data from the lightbulb 12 and/or retrieve stored data from the lightbulb 12, the memory 32, the databases 36, or any combination thereof. Although the method 50 is described in a particular order, it should be noted that the method 50 may be performed in any suitable order and is not limited to the order presented herein. Furthermore, certain blocks may be omitted, and/or additional blocks may be added. It should also be noted that although each block is described below in the method 50 as being performed by the computing system 14, other suitable computing systems may perform the methods described herein.

Referring now to FIG. 2, at block 52 the one or more sensors 20, which may be coupled to or integrated into the lightbulb 12, may measure a current level (e.g., tilt) of the foundation of the structure. That is, the current level of the foundation is the current level of tilt of the foundation of the structure. The one or more sensors 20 may be configured to measure the current level of the foundation relative to a flat, 180-degree angle planar surface. The foundation may differ from one spot in the foundation relative to another. So it is advantageous to measure the tilt relative to a planar surface rather than a one-dimensional surface to enable the one or more sensors 20 to get a broader perspective of the foundation tilt. For example, the one or more sensors 20 may measure that the foundation is 3 degrees below the 180-degree planar surface on the right side of a room, but 4 degrees above the 180-degree planar surface on the left side of the room. This data may then be collected and communicated to the computing system 14.

After receiving the collected data from the one or more sensors 20, the computing system 14 may, at block 54, compare the current level of the foundation to the threshold. The threshold may be generated by the computing system 14, such as via any of the techniques disclosed herein. The threshold may be stored in the memory 26 of the lightbulb 12, the memory 32 of the computing system 14, the databases 36, or any combination thereof. For example, the computing system 14 may determine the threshold by taking the average of respective foundation tilt values of surrounding structures or other relevant structures. This may be particularly advantageous when the structure is not new and/or in areas where a majority of the structures are not new since the foundations may have some degree of tilt (e.g., more than newer structures). In such cases, the threshold (e.g., a baseline or initial threshold) may differ from (e.g., be greater than) the threshold for newer structures with newer foundations. Thus, the threshold may be unique to the structure and/or customized to the structure.

The computing system 14 may compare the current level of the foundation to the threshold by determining whether the current level of the foundation meets and/or exceeds the threshold. The current level of the foundation and the threshold may be measured using the same units (e.g., degrees, feet, inches, meters, centimeters, millimeters), different units, or any combination thereof. In instances where the current level of the foundation and the threshold may be measured with different units, the computing system 14 may convert the threshold into the same units as the current level of the foundation, or vice versa.

After the computing system 14 compares the current level of the foundation to the threshold, the computing system 14 may output an indication based on the comparison of the current level of the foundation to the threshold, via the lightbulb 12, the mobile electronic device 16, or any combination thereof, as indicated by block 56. The indication may be the visual indication emitted by the emitter 18 of the lightbulb 12, the electronic notification presented on the display 38 of the mobile electronic device 16, or any combination thereof. For example, if the current level of the foundation exceeds the threshold, then the emitter 18 of the lightbulb 12 may emit a red light to alert the user of the structure.

In addition, or alternatively, the computing system 14 may communicate to the mobile electronic device 16 that the current level of the foundation exceeds the threshold. In some embodiments, the mobile electronic device 16 may present data associated with the comparison of the current level of the foundation with the threshold to the display 38. The mobile electronic device 16 may present a graph, a map or diagram of the property, recommendations, or any combinations thereof. For example, the mobile electronic device 16 may present a graph showing the foundation tilt over a time interval (e.g., 1 month, 3 months, 1 year, 5 years). Along with the graph, the mobile electronic device 16 may present recommended actions to perform to address the foundation tilt, and a time period within which the actions should be completed. The recommended actions may include, but are not limited to, watering the foundation and/or soil. The method 50 may also include adjusting insurance costs for the structure based on the foundation tilt and/or completion of the recommended actions.

Figure 3:
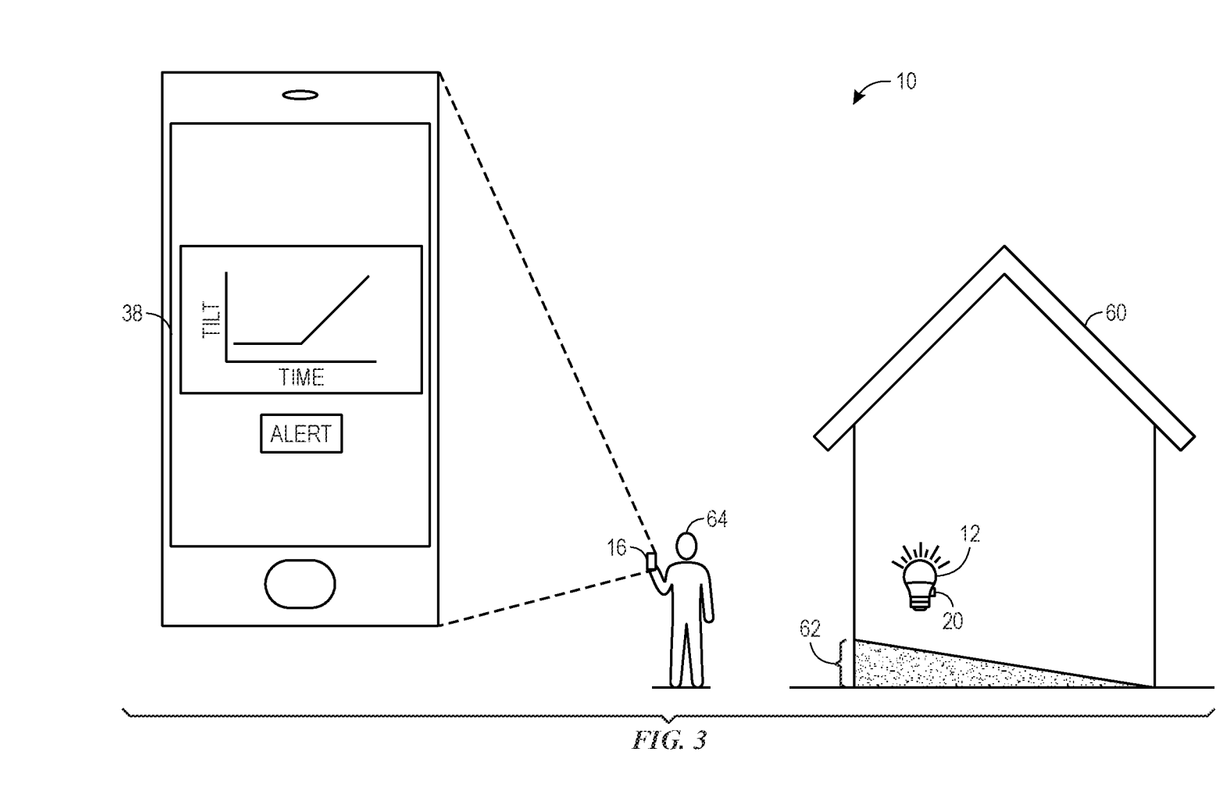
FIG. 3 illustrates a schematic diagram of the foundation tilt reporting system of FIG. 1 in use to monitor a foundation of a structure, in accordance with embodiments described herein.

Moving on to FIG. 3, a schematic diagram of the foundation tilt reporting system 10 in use to monitor a foundation. A property 60 (e.g., a residential house) is shown having a foundation with a tilt 62. The lightbulb 12 is disposed within the property 60. The lightbulb 12 may be coupled to or include the one or more sensors 20. A user 64 may be positioned inside or outside of the property 60. As mentioned herein, upon determination that the tilt 62 exceeds the threshold, the computing system 14 may output an indication based on the comparison of the current level of the foundation to the threshold via the lightbulb 12, the mobile electronic device 16, or any combination thereof. The display 38 of the mobile electronic device 16 is enlarged to show an example presentation. The display 38 shows an example of the graph of the tilt (e.g., the current level) over time (e.g., the time interval). The example graph illustrates a steep increase in the tilt. This may be in response to a natural event (e.g., hurricane, earthquake). In the case when the user 64 is not present on the property 60, the electronic notification may make the user 64 aware of the tilt without being present at the property 60.

The technical effects of the systems and methods described herein include using data acquired from the one or more sensors to determine the foundation tilt, and using the lightbulb to provide an efficient, effective indication of the foundation tilt. Advantageously, the lightbulb may operate as a typical lightbulb or light source for the structure (e.g., to illuminate a room upon actuation of an input device, such as a light switch), and the lightbulb may also be wired and/or controlled to operate as an alert device for the foundation tilt. In some cases, this may be done simultaneously via two light emitters or sequentially via an ordered illumination (e.g., first the alert, then the typical light; the typical light, which is interrupted by the alert upon detection of the foundation tilt exceeding the threshold). In any case, the one or more sensors may operate to collect data and/or the lightbulb may illuminate at any suitable time to provide a current condition of the foundation tilt.

Moreover, the present embodiments disclosed herein address problems associated with collecting data, such as using the data available via sensors to provide accurate measurements regarding the foundation tilt, and presenting the property owner with recommendations upon determining that the foundation tilt has exceed the threshold. Further, the present embodiments enable a user to view data regarding a foundation tilt of the property in an efficient manner without having to navigate through various access points, websites, or the like. It should be appreciated that the disclosed embodiments may be adapted for use with any of a variety of structures, including bridges, skyscrapers, and vehicles.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A foundation tilt reporting system, comprising:
 a lightbulb comprising one or more emitters configured to emit light;
 one or more sensors configured to generate signals indicative of a current tilt of a foundation of a structure;
 one or more processors; and
 memory storing instructions executable by the one or more processors to cause the one or more processors to:
  access a threshold for the foundation;
  receive the signals indicative of the current tilt of the foundation from the one or more sensors;
  compare the current tilt of the foundation to the threshold; and
  instruct the one or more emitters to emit the light to provide an indication in response to the current tilt of the foundation meeting or exceeding the threshold.

2. The foundation tilt reporting system of claim 1, wherein the light comprises visible light.

3. The foundation tilt reporting system of claim 1, wherein the one or more sensors comprises a laser-level sensor, a gyroscope, an accelerometer, a positon sensor, or any combination thereof.

4. The foundation tilt reporting system of claim 1, wherein the one or more sensors are physically coupled to or are positioned within the lightbulb.

5. The foundation tilt reporting system of claim 1, wherein the threshold is an average value of respective foundation tilts of surrounding structures.

6. The foundation tilt reporting system of claim 5, wherein the threshold is the average value of the respective foundation tilts of the surrounding structures that have respective characteristics that correspond to characteristics of the structure.

7. The foundation tilt reporting system of claim 6, wherein the characteristics comprise a size, an age, a type of usage, a type of foundation, or any combination thereof.

8. The foundation tilt reporting system of claim 1, wherein the instructions are executable by the one or more processors to cause the one or more processors to instruct the one or more emitters to emit the light with one or more first properties to provide the indication in response to the current tilt of the foundation meeting or exceeding the threshold.

9. The foundation tilt reporting system of claim 8, wherein the instructions are executable by the one or more processors to cause the one or more processors to instruct the one or more emitters to emit the light with one or more second properties to illuminate an area surrounding the lightbulb, wherein the one or more first properties are different from the one or more second properties.

10. A method of operating a foundation tilt reporting system, the method comprising:
    accessing, via one or more processors, a threshold for a foundation of a structure;
    receiving, at one or more processors, signals indicative of a current tilt of the foundation of the structure from one or more sensors;
    comparing, using the one or more processors, the current tilt of the foundation of the structure to the threshold; and
    instructing, using the one or more processors, one or more emitters of a lightbulb to emit light to provide an indication in response to the current tilt of the foundation of the structure exceeding the threshold.

11. The method of claim 10, comprising instructing, using the one or more processors, the one or more emitters to emit the light with one or more first properties to provide the indication in response to the current tilt of the foundation meeting or exceeding the threshold.

12. The method of claim 11, comprising instructing, using the one or more processors, the one or more emitters to emit the light with one or more second properties to illuminate an area surrounding the lightbulb, wherein the one or more first properties are different from the one or more second properties.

13. The method of claim 12, comprising instructing, using the one or more processors, the one or more emitters to emit the light with the one or more first properties periodically or continuously while the current tilt of the foundation meets or exceeds the threshold.

14. The method of claim 10, comprising instructing, using the one or more processors, presentation of a graphical user interface on a display screen of a mobile electronic device, wherein the graphical user interface includes a curve that represents a tilt of the foundation over time.

15. The method of claim 10, comprising:
    receiving, at the one or more processors, additional signals indicative of respective current tilts of respective foundations of other structures from one or more respective sensors positioned at the other structures; and
    determining, using the one or more processors, the threshold based on the additional signals.

16. A lightbulb for a foundation tilt reporting system, comprising:
    a housing comprising a transparent or semi-transparent portion and a base portion;
    one or more emitters configured to emit light through the transparent or semi-transparent portion;
    one or more processors; and
    memory storing instructions executable by the one or more processors to cause the one or more processors to:
        access a threshold for a foundation of a structure;
        receive signals indicative of a current tilt of the foundation;
        compare the current tilt of the foundation to the threshold; and
        instruct the one or more emitters to emit the light in response to the current tilt of the foundation meeting or exceeding the threshold.

17. The lightbulb of claim 16, comprising one or more sensors supported by the base portion and configured to generate the signals indicative of the current tilt of the foundation.

18. The lightbulb of claim 16, wherein the instructions are executable by the one or more processors to cause the one or more processors to instruct the one or more emitters to emit the light with one or more first properties in response to the current tilt of the foundation meeting or exceeding the threshold.

19. The lightbulb of claim 18, wherein the instructions are executable by the one or more processors to cause the one or more processors to instruct the one or more emitters to emit the light with one or more second properties to illuminate an area surrounding the lightbulb while the current tilt of the foundation is below the threshold, wherein the one or more first properties are different from the one or more second properties.

20. The lightbulb of claim 16, wherein the instructions are executable by the one or more processors to cause the one or more processors to communicate the current tilt to a mobile electronic device in response to the current tilt meeting or exceeding the threshold.

* * * * *